United States Patent [19]

Skrzec

[11] 4,241,021
[45] Dec. 23, 1980

[54] FLUIDIZED BED REACTOR SYSTEM

[75] Inventor: Adam E. Skrzec, West Nyack, N.Y.

[73] Assignee: Stauffer Chemical Company, Westport, Conn.

[21] Appl. No.: 39,055

[22] Filed: May 14, 1979

[51] Int. Cl.³ ............................................. B01J 8/18
[52] U.S. Cl. .................................. 422/143; 422/146; 34/57 A; 239/288.5
[58] Field of Search ............... 422/139, 140, 141, 142, 422/143, 146, 144; 34/57 R, 57 A; 239/288, 288.3, 288.5; 201/31; 202/121

[56] References Cited

U.S. PATENT DOCUMENTS

| | | | |
|---|---|---|---|
| 2,394,651 | 2/1946 | Alther | 196/52 |
| 2,494,614 | 1/1950 | Grote | 252/417 |
| 2,647,738 | 8/1953 | Trainer | 263/43 |
| 2,798,030 | 7/1957 | Hettick et al. | 196/52 |
| 2,910,431 | 10/1959 | Sage et al. | 208/159 |
| 2,995,426 | 8/1961 | Keith | 422/142 |
| 3,250,521 | 5/1966 | Sergent | 263/21 |
| 3,259,998 | 7/1966 | Leclere et al. | 34/57 |
| 3,298,793 | 1/1967 | Mallison et al. | 422/139 |
| 3,721,608 | 3/1973 | Saller et al. | 34/57 A |
| 3,752,224 | 8/1973 | Sproul | 165/47 |
| 3,806,324 | 4/1974 | MacLean et al. | 422/139 |
| 3,912,460 | 10/1975 | McGann | 239/559 |
| 4,115,072 | 9/1978 | Nielson | 422/139 |

Primary Examiner—S. Leon Bashore
Assistant Examiner—Chris Konkol
Attorney, Agent, or Firm—Michael E. Zall

[57] ABSTRACT

A fluidized bed reactor system comprising a vessel adapted to contain a fluidized bed. A plurality of fluid injector means are mounted through the vessel wall for injecting and distributing a fluidizing medium into the lower portion of the vessel. Each injector means is comprised of an injector having a nozzle end projecting into the vessel. The injector is withdrawably mounted through the vessel wall, the nozzle end having at least one downwardly directed orifice. A shield means is provided which is mounted to the vessel wall above the nozzle end for maintaining a nozzle opening in the bed when the injector is withdrawn. The reactor system is further comprised of a fluid supply means in fluid communication with each injector for supplying the fluidizing medium to each nozzle end. When it is required to replace the injector due, for example, to clogging of the orifices or deterioration of the nozzle end, the injector is withdrawn from the vessel, replaced or repaired and then inserted into the vessel. The shield means allows for the easy insertion of the injector into the vessel by maintaining a nozzle opening in the bed, whether fluidized or non-fluidized. The fluidized bed reactor system allows for the replacement or repair of injectors without the necessity for shutting down and/or cleaning out the vessel.

4 Claims, 4 Drawing Figures

FLUIDIZED BED REACTOR SYSTEM

BACKGROUND OF THE INVENTION

1. Field of the Invention

This invention relates to reactor systems, and more particularly to a fluidized bed reactor system having an improved means for supplying the fluidizing medium to the reactor system.

2. Prior Art

Fluidized bed reactor systems are widely used in the processing and treatment of many materials. Typically, fluidized bed reactor systems consist of a vessel adapted to contain the fluidized bed with a fluidizing medium fed uniformly into the internal bottom portion of the vessel. For example, in one type of system, a constriction plate is positioned within the vessel above the vessel bottom to thereby define a plenum into which fluid, under pressure, is fed. The fluid then flows through nozzles or other suitable openings in the constriction plate at a sufficiently high velocity to fluidize the particulate bed located above the constriction plate.

Another type of fluidized bed reactor system utilizes a plurality of fluid distribution pipes located in the interior bottom portion of the reactor. The fluidizing medium, under pressure, is then fed through the distribution pipes and out suitably dimensioned holes in the pipes. The fluid flows into the vessel at a sufficiently high velocity to fluidize the particulate bed.

Typical fluid bed reactor systems are exemplified by the following U.S. patents:

U.S. Pat. No. 2,394,651 to Alther;
U.S. Pat. No. 2,494,614 to Grote;
U.S. Pat. No. 2,647,738 to Trainer;
U.S. Pat. No. 2,798,030 to Hettick et al.;
U.S. Pat. No. 2,910,431 to Sage et al.;
U.S. Pat. No. 2,995,426 to Keith et al.;
U.S. Pat. No. 3,250,521 to Sergent;
U.S. Pat. No. 3,259,998 to Leclere;
U.S. Pat. No. 3,298,793 to Mallison et al.;
U.S. Pat. No. 3,752,224 to Sproul;
U.S. Pat. No. 3,806,324 to Maclean et al.; and
U.S. Pat. No. 3,912,460 to McGann.

A particular problem which develops in fluid bed reactor systems is that the constriction plates and fluid distribution pipes employed by the prior art systems tend to clog and deteriorate. In order to correct this problem, by either repair or replacement of the constriction plate or distribution pipe, the reactor system must be shut down and cleaned out. Additionally, someone must go into the reactor vessel to disassemble and dismantle the constriction plate or distribution pipe and replace or repair it. This procedure, of necessity, entails a significant amount of down time for the fluid bed reactor system.

SUMMARY OF THE INVENTION

It is an object of this invention to provide a fluidized bed reactor system having easily removable and replaceable injectors which can be replaced or repaired without shutting down and/or cleaning out the reactor vessel.

More specifically, this invention is directed to a fluidized bed reactor system which comprises:

(a) a vessel adapted to contain a fluidized bed;
(b) a plurality of fluid injector means mounted through the vessel wall for injecting and distributing a fluidizing medium into the lower portion of the vessel, each injector means comprising;
  (i) an injector having a nozzle end projecting into the vessel, the injector being withdrawably mounted to the vessel wall, the nozzle end having at least one downwardly directed orifice; and
  (ii) a shield means mounted to the vessel wall above the nozzle end for maintaining a nozzle opening in the bed when the injector is withdrawn; and
(c) a fluid supply means in fluid communication with each injector for supplying the fluidizing medium to each nozzle end.

BRIEF DESCRIPTION OF THE DRAWINGS

The invention will now be described further in conjunction with the attached drawings in which.

DETAILED DESCRIPTION OF THE INVENTION

The fluid bed reactor system of this invention may be utilized in any process wherein such system would be advantageous. A particularly preferred use of the fluidized bed reactor system of this invention is to produce vanadium chlorides by reacting vanadium oxide with chlorine and carbon, see for example, "Process for Producing Vanadium Chlorides" to Cotter et al., U.S. Ser. No. 873,297, filed on Jan. 30, 1978, now U.S. Pat. No. 4,169,135, the entire disclosure of which is incorporated herein by reference.

A preferred system of this invention is depicted in FIGS. 1 through 4, and is described herein. This invention, however, is not to be deemed so limited.

Figure 1:
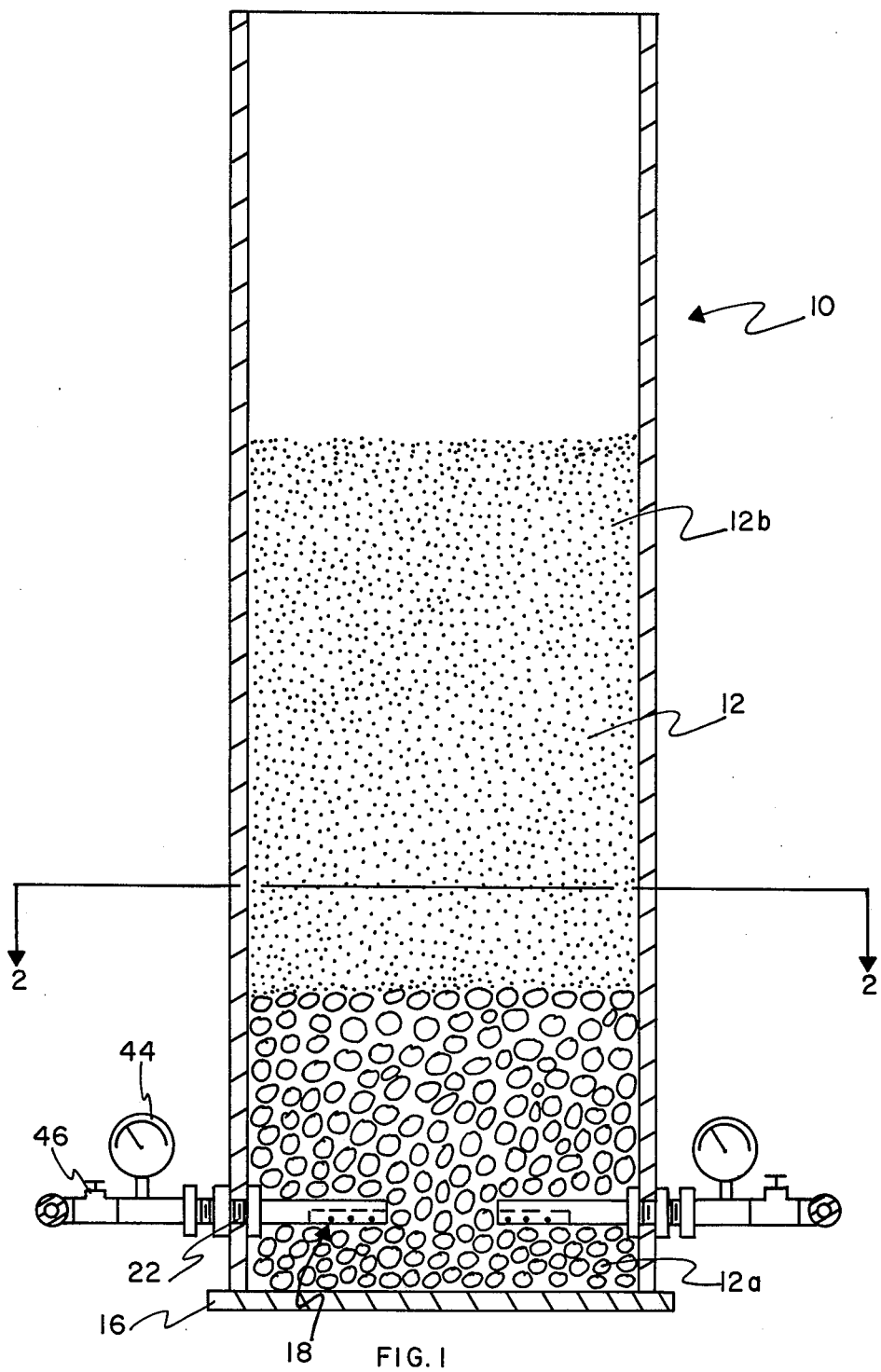
FIG. 1 is a vertical sectional view of a preferred embodiment of the fluidized bed reactor system of this invention.
Figure 2:
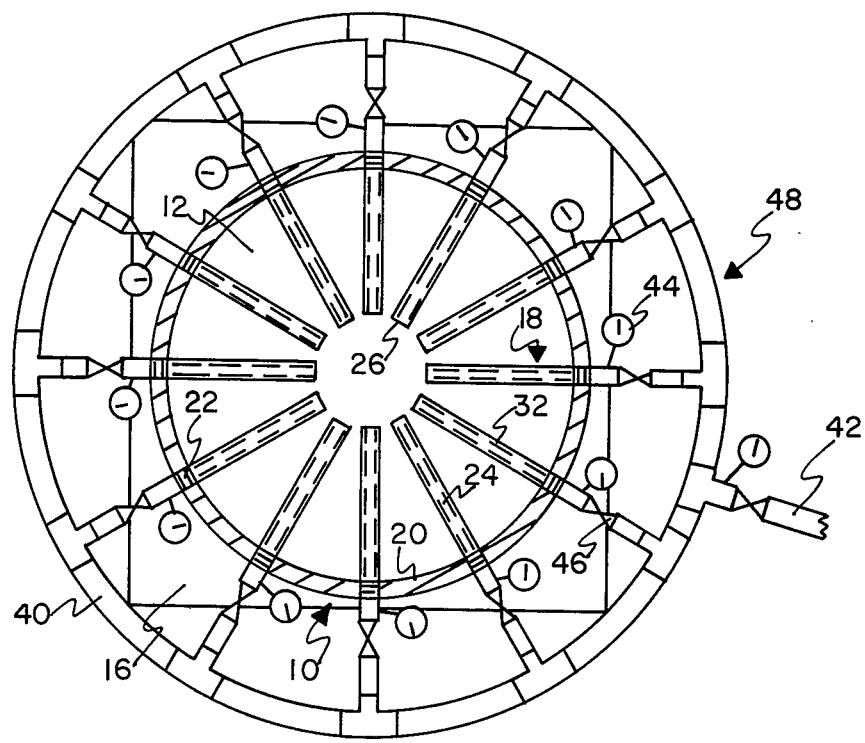
FIG. 2 is a plan view partially in section, of the fluidized bed reactor system of FIG. 1 taken along line 2—2 of FIG. 1.

As shown in the drawings, with particular reference to FIGS. 1 and 2, the fluidized bed reactor system of this invention is comprised of a vessel (10) adapted to contain a fluidized bed, generally designated (12).

The vessel (10) is of cylindrical configuration although this invention contemplates that it may be any type configuration, e.g. rectangular, conical, etc. Typically, the vessel (10) may be made of metal plate, usually a low carbon steel. The vessel (10) can be readily fabricated from carbon steel plate by known fabricating techniques. The sections can be readily joined together by welding to complete the vessel. The internal surface of the vessel may be lined with an insulation material (not shown) to protect the vessel against the internal high temperatures involved in processing operations.

A plurality of fluid injector means, generally designated (18) are mounted through the vessel wall (20). The fluid injector means (18) functions to inject and distribute a fluidizing medium into the lower portion of the bed (12a). The fluid injector means (18) preferably replaces the function of the constriction plate utilized in other known fluidized bed reactor systems, but may be utilized to compliment the fluid flow from such constriction plates.

In producing vanadium chlorides, for example, with the fluid bed reactor system of this invention, the upper portion of the bed (12b) contains activated carbon particles and vanadium pentoxide, while the fluidizing medium flowing through the injector means (18) is chlorine gas.

The lower portion of the bed (12a) may contain a "grog", i.e. a refractory material such as silica, alumina, etc. which is inert and temperature stable. The "grog" provides insulation between the high temperature upper portion of the bed (12b), containing, for example, carbon and vanadium pentoxide, and the fluid injector means (18). The "grog" may or may not be fluidized. The "grog" can act, to a certain extent, as a fluid distribution means.

Figure 3:
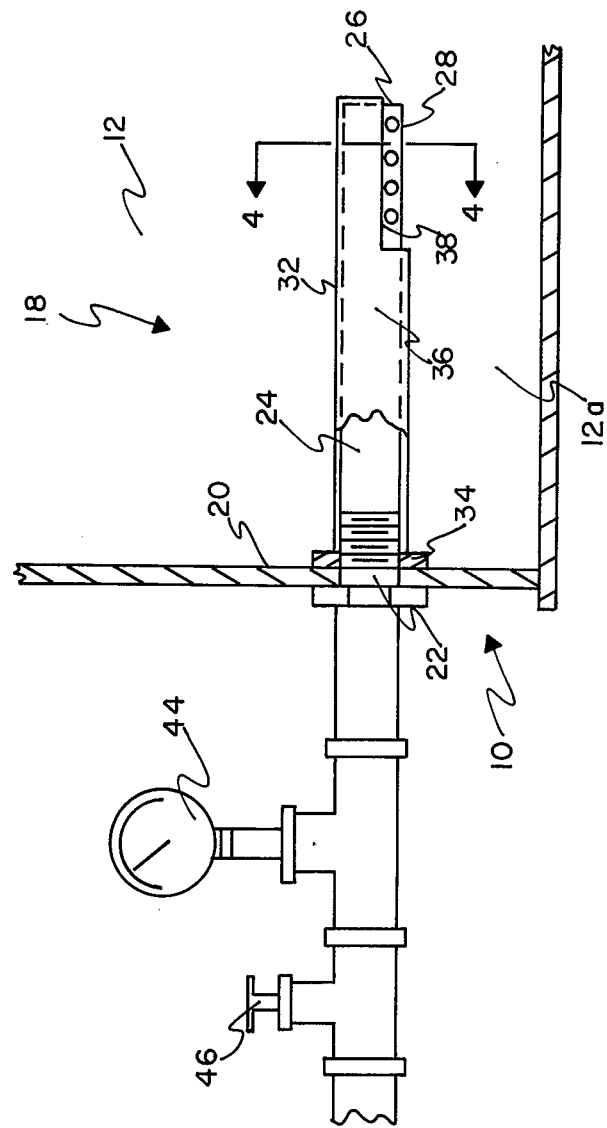
FIG. 3 is a detailed sectional view of the injector means utilized in the fluidized bed reactor system depicted in FIG. 1.

Referring to FIG. 3, each injector means (18) is comprised of an injector (24), preferably projecting radially into the vessel (10) from the vessel wall (20). This configuration is particularly preferred when a heating or cooling element (not shown) projects vertically upward in the center of the vessel (10). Such element may be supported by plate (16) at the bottom of the vessel (10).

The injector (24) has a nozzle end (26) projecting into the vessel (10). The injector (24) is withdrawably mounted through the vessel wall (20). By the use of the term "withdrawably mounted", or words to that effect, it is meant that the injector (24) is mounted through the vessel wall (20) in such a manner that the injector (24) can be withdrawn from the vessel (10) from outside the vessel (10).

FIG. 3 depicts a method of withdrawably mounting the injector (24). Preferably this is accomplished by having the injector (24) threadably mounted to the vessel wall (20). One skilled in the art can readily conceive of other methods of withdrawably mounting the injector (24) through the vessel wall (20).

The injector (24) has at least one downwardly directed orifice (28). Preferably the injector (24) is a tubular member closed at the nozzle end (26) and having a plurality of orifices (28) along the lower half of the member. These orifices (28) are of such number and size so as to provide for a sufficiently high velocity and sufficient distribution of fluidizing medium to fluidize the bed (12). One skilled in the art can readily determine the number and sizes of such orifices (28).

Figure 4:
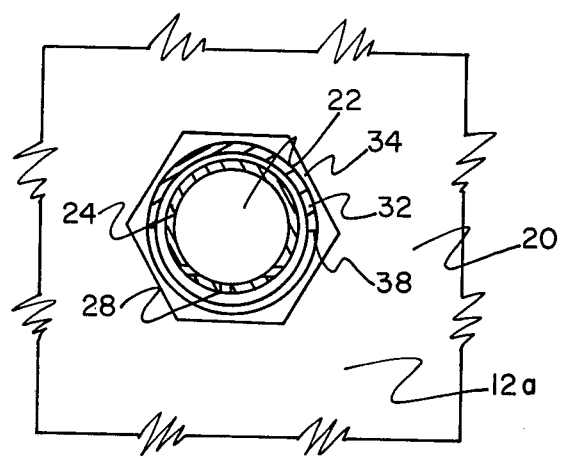
FIG. 4 is a sectional view of the injector means taken along line 4—4 of FIG. 3.

Referring to FIGS. 3 and 4, the shield means, generally designated (32) is mounted to the vessel wall (20) above the nozzle end (26). The shield means (32) maintains a nozzle opening in the bed (12) when the injector (24) is withdrawn.

A problem associated with having a withdrawably mounted injector (24) is that when the injector (24) is withdrawn from the vessel (10), the bed (12), particularly if "grog" is used in the lower portion of the bed (12a), closes or collapses in the area of the nozzle opening (22) in the vessel wall (20) and makes it extremely difficult to reinsert the injector (24) into the vessel (10). The shield means (32) maintains an opening in the bed so that the injector (24) may be reinserted easily into the bed (12). The shield means (32) is preferably attached to the vessel wall (20). The shield means (32) may be threadably mounted to a coupling (34) attached to the vessel wall (20). The shield means (32) remains in the lower portion of the bed (12a) when the injector (24) is withdrawn from the bed (12). Preferably, the shield means (32) is a pipe member (36) which is concentric to the tubular member used as the injector (24). The pipe member (36) is open along the lower half (38) to permit injection of the fluidizing medium from the orifices (28) of the tubular member into the vessel (10).

Referring to FIG. 2, a fluid supply means, generally designated (48) is in fluid communication with each injector (24) and supplies the fluidizing medium to each nozzle end (26).

A preferred fluidized bed reactor system has each of the fluid injector means (18) coupled to a gas equalizing header (40). Feeding into the header (40) would be single or multiple gas feed lines (42). Each of the fluid injector means (18), preferably has a pressure gauge (44) and a control valve (46) to control and equalize the flow of fluidizing medium through the fluid injector means (18).

In order to repair or replace an injector (24), the control valve (46) is closed and the injector (24) withdrawn from the vessel (10). During this time the fluidized bed system may be kept in operation or shut down, as desired by the operator. A new or repaired injector (24) is then inserted into the vessel (10), attached to the vessel wall (20) and equalizing header (40) and the control valve (46) opened. The shield means (32) provides for the easy insertion of the injector (24) into the bed (12). The shield means (32) is particularly useful if it is desired to shut down the fluid bed (12) or the "grog" is not fluidized, for under these conditions the lower portion of the bed (12a) is dense thereby making it almost impossible to reinsert the injector (24).

The foregoing detailed description has been given for clarity only, and no unnecessary limitations should be understood therefrom, as modifications will be obvious to those skilled in the art.

What is claimed is:

1. A fluidized bed reactor system comprising:
  (a) a vessel adapted to contain a fluidized bed;
  (b) a plurality of fluid injector means mounted through the vessel wall for injecting and distributing a fluidizing medium into the lower portion of the vessel, each injector means comprising:
    (i) an elongated injector projecting into the vessel, the injector being withdrawably mounted through the vessel wall, and having at least one downwardly directed orifice, and
    (ii) a shield means mounted to the vessel wall extending above the injector along the length of the injector for maintaining an opening in the bed when the injector is withdrawn, the opening being substantially equivalent to the length of the injector;
  (c) a fluid supply means in fluid communication with each elongated injector for supplying a fluidizing medium to the fluidized bed.

2. The reactor system of claim 1, wherein the elongated injector projects radially into the vessel from the vessel wall.

3. The reactor system of claim 2, wherein the elongated injector is an elongated tubular member closed at the end projecting into the vessel and having a plurality of orifices along the lower half of the member.

4. The reactor system of claim 3, wherein the shield means is a pipe member which is concentric to the tubular member and open along at least a portion the lower half to permit injection of the fluidizing medium from the orifices of the tubular member into the vessel.

* * * * *